3,240,805
PROCESS FOR PRODUCING ACETIC ACID
Anthony N. Naglieri, Bronx, N.Y., assignor to
Halcon International, Inc.
No Drawing. Filed Oct. 13, 1961, Ser. No. 144,853
2 Claims. (Cl. 260—533)

This invention relates to the production of acetic acid. More particularly, the present invention involves the production of acetic acid by the catalytic oxidation of ethylene.

Acetic acid is a valuable commercial chemical. Various techniques have heretofore been practiced for the production of acetic acid. Illustrative prior techniques have involved the oxidation of acetaldehyde using a catalyst such as manganous acetate. Other prior processes have involved the fermentation of materials such as carbohydrates to vinegar. Still other processes have involved the reaction of methanol and carbon monoxide. The processes previously employed in the production of acetic acid have generally involved the use of costly starting materials and/or costly and elaborate operating procedures.

It is an object of the present invention to provide a novel and improved method for producing acetic acid.

It is a further object of the invention to provide a method for producing acetic acid by the catalytic oxidation of ethylene.

In accordance with the present invention, ethylene is subjected to a catalytic vapor phase oxidation in contact with a catalyst containing palladium together with vanadium or molybdenum to produce high yields of acetic acid. The acetic acid is readily separated from the oxidation reaction mixture in high purity.

The catalyst which is employed in accordance with the invention contains as essential constituents palladium and a component from the group of vanadium and molybdenum, suitably deposited on an inert support. The preferred support is ceramically bonded alpha alumina, although other supports including silicon carbide, silicon dioxide, and the like can be used.

The palladium is deposited on the support suitably in the form of the chloride or other salt in amounts ranging from about 0.1 to 5% by weight of the catalyst composition. The vanadium and molybdenum are deposited, suitably in the form of a salt, such as the chloride, which may be decomposable to the oxide, in amounts of 1 to 20% by weight of the catalyst composition.

In especially preferred practice of the invention, the catalyst comprises a ceramically bonded alpha alumina support containing as essential catalytic components 0.1 to 5% $PdCl_2$ and 1 to 20% $V_2O_5$.

The gaseous reaction feed mixture desirably contains ethylene in an amount of 0.1 to 5% by volume, preferably 0.5–2%, and most desirably about 1%. Molecular oxygen in excess of that required to oxidize the ethylene to acetic acid is also contained in the charge mixture. Generally, it is preferred and desirable to employ air as a source of molecular oxygen. However, pure oxygen or gaseous mixtures containing greater or less amounts of oxygen than air can also be employed. It has been found that the use of large amounts of steam of the order of about 60% by volume of the total gaseous charge mixture results in the highest reaction selectivity to acetic acid. However, the use of such large quantities of steam has the disadvantage that separating product acetic acid from such large quantities of steam constitutes an additional expense. It is accordingly, most desirable to employ steam in amounts of about 1 to 10% by volume based on the total gaseous charge in carrying out the invention. It is quite possible to carry out this process without the use of steam in the charge mixture. However, the reaction selectivity is somewhat lower when no steam is employed.

The temperature of the catalytic oxidation reaction is critical and must be properly regulated in order to obtain satisfactory conversions of ethylene to acetic acid in accordance with this invention. Temperatures in the range of about 150° C. to 300° C. can be employed. A preferred temperature range is 200 to 250° C. and a most desirable range is about 215 to 240° C.

The ethylene oxidation can be carried out over a broad operating pressure range, e.g. 1 to 1000 atmospheres. However, outstanding process advantages are achieved when the oxidation is conducted at moderately elevated pressures of about 50 to 250 p.s.i.a., most desirably about 150 p.s.i.a. Among the advantages derived from the use of the elevated pressures are greater ease of product recovery, lower power requirements, and greatly lessened catalyst and equipment costs per unit of product.

Space velocities in the broad range of 50 to 3000 reciprocal hours, preferably 100 to 1000 and desirably 200 to 500 are employed in the present invention.

Through practice of the instant invention, ethylene conversions of 100% with a molar selectivity of 60% or greater to acetic acid can be obtained.

The following examples illustrate the invention:

EXAMPLE 1

A catalyst was prepared for the vapor phase oxidation of ethylene in accordance with this invention. The catalyst consisted of 0.2% by weight $PdCl_2$ and 9.5% by weight $V_2O_5$ supported on 3–5 mesh ceramically bonded fused alpha alumina having a surface area of about 1 sq. meter per gram. The catalyst was prepared by impregnating the support with a solution of $PdCl_2$ and $NH_4VO_3$ in concentrated HCl and calcining the impregnated catalyst at 400° C. for two hours.

The above catalyst was used in a series of runs at substantially atmospheric pressure. The following table shows the reaction conditions and the results obtained:

Table 1

| Run | Feed (liters/hr. STP) | | | Space velocity, hr.$^{-1}$ | Reactor temp., ° C. | Percent $C_2H_4$ converted | Mol percent selectivity to acetic acid |
|---|---|---|---|---|---|---|---|
| | Air | $C_2H_4$ | $H_2O$ [1] | | | | |
| 1 | 53.2 | 1.52 | 93.6 | 371 | 209 | 81.8 | 45.4 |
| 2 | 27.4 | 0.82 | 47.7 | 190 | 209 | 100 | 29.0 |
| 3 | 27.4 | 0.71 | 48.3 | 191 | 238 | 100 | 67.7 |
| 4 | 53.1 | 1.53 | 93.0 | 369 | 240 | 91.5 | 54.6 |
| 5 | 27.4 | 0.77 | 47.8 | 190 | 235 | 100 | 59.2 |
| 6 | 27.4 | 0.79 | 48.4 | 191 | 238 | 100 | 59.2 |
| 7 | 147 | 1.48 | 0 | 371 | 238 | 51.6 | 37.2 |
| 8 | 147 | 3.05 | 0 | 375 | 238 | 37.2 | 39.5 |
| 9 | 130 | 0.63 | 15.4 | 365 | 238 | 100 | 50.2 |
| 10 | 130 | 1.50 | 14.9 | 365 | 235 | 100 | 44.6 |
| 11 | 131 | 1.38 | 7.2 | 349 | 238 | 100 | 43.8 |
| 12 | 145 | 1.47 | 5.2 | 379 | 238 | 100 | 37.8 |
| 13 | 131 | 3.09 | 12.6 | 367 | 238 | 70.6 | 50.3 |
| 14 | 144 | 3.06 | 6.2 | 383 | 238 | 57.4 | 51.0 |

[1] Vapor.

The above results demonstrate the high conversions and yields obtained through practice of the invention. Additionally, these results show that the use of high quantities of steam in the feed enhances selectivity to acetic acid although the process is operative with reduced amounts or no steam. In the above examples, no aldehyde in the final product was detected.

EXAMPLE 2

A catalyst was prepared as described in U.S. Patent 2,777,860 Example 1.

This catalyst was impregnated with a dilute hydrochloric acid solution containing $PdCl_2$, $CuAc_2$, and $FeCl_3$. The resulting catalyst contained by weight 0.2% $PdCl_2$, 0.54% $CuAc_2$ and 0.54% $FeCl_3$.

The catalyst was used in a series of ethylene oxidation runs at substantially atmospheric pressure. The following table shows the reaction conditions and results obtained.

Table II

| Run | Feed (liters/hr. STP) | | | Space velocity, hr.$^{-1}$ | Reactor temp., °C. | Percent C$_2$H$_4$ converted | Mol percent selectivity to acetic acid |
|---|---|---|---|---|---|---|---|
| | Air | C$_2$H$_4$ | H$_2$O [1] | | | | |
| 15 | 91 | 1.9 | 111 | 464 | 149 | 68.9 | 4.3 |
| 16 | 25.7 | 0.62 | 34.2 | 144 | 225 | 100 | 45.3 |
| 17 | 91 | 2.0 | 162 | 580 | 268 | 100 | 38.4 |
| 18 | 50.9 | 1.1 | 90.8 | 325 | 261 | 97.8 | 29.2 |
| 19 | 27.3 | 0.66 | 162 | 146 | 149 | 98.2 | 12.9 |
| 20 | 91.0 | 1.6 | 91.2 | 580 | 221 | 88.0 | 44.7 |
| 21 | 50.9 | 1.0 | 91.2 | 325 | 221 | 92.1 | 46.2 |
| 22 | 50.8 | 1.1 | 91.2 | 325 | 227 | 97.7 | 53.6 |
| 23 | 90.7 | 1.9 | 162 | 578 | 313 | 100 | 3.0 |
| 24 | 50.6 | 1.3 | 101 | 347 | 314 | 100 | 2.4 |
| 25 | 291 | 8.0 | 488 | 1,790 | 324 | 58.5 | 22.8 |

[1] Vapor.

The results demonstrate the effect of such process variables as temperature, space velocity, and feed composition on reaction selectivities and product yields. No aldehyde was detected in the product.

EXAMPLE 3

A catalyst was prepared similar to that of Example I except the catalyst contained 4.7% MoO$_3$ in place of the 9.5% V$_2$O$_5$.

A gas charge mixture of 25.6 l./hr. air, 0.79 l./hr. ethylene and 47.1 l./hr. water vapor was passed over the said catalyst at a space velocity 184 reciprocal hours. The reaction temperature was 210° C. and pressure was substantially atmospheric. About 8.9% of the ethylene reacted with about a 52.9% molar selectivity to acetic acid; no aldehyde was detected in the product.

EXAMPLE 4

A gaseous charge mixture having the composition by volume of 2% ethylene, 6% steam, 8% oxygen, 6% carbon dioxide and 78% nitrogen is passed over the catalyst of Example 1 at 226° C. and a pressure of about 150 p.s.i.a. Space velocity is 2340 reciprocal hours.

The ethylene conversion is about 100% with a selectivity to acetic acid of about 59.5%; no aldehyde is obtained in the product.

I claim:
1. The method of preparing acetic acid substantially acetaldehyde free which comprises contacting a gaseous mixture containing (1) 0.1 to 5% by volume of ethylene, (2) molecular oxygen, and (3) up to 60% by volume water vapor at a temperature of about 150 to 300° C. and at a pressure of 1 to 1,000 atmospheres, with a supported catalyst which consists essentially of 0.1 to 5% by weight PdCl$_2$ and about 5 to 20% by weight V$_2$O$_5$ based upon total weight of catalyst and support.

2. The method of claim 1 wherein the gaseous mixture is contacted with the catalyst at a space velocity between 50 and 3,000 reciprocal hours and the catalyst support is ceramically bonded alpha alumina.

References Cited by the Examiner

UNITED STATES PATENTS 2,265,948  12/1941  Loder _____ 260—533
3,057,915  10/1963  Riemenschneider et al.
                                           260—533

FOREIGN PATENTS 397,161  8/1933  Great Britain.

OTHER REFERENCES

Beilstein's: "Handuch der Organische Chemie," vol. 2, p. 97 (1920).

LORRAINE A. WEINBERGER, *Primary Examiner.*

CHARLES B. PARKER, LEON ZITVER, *Examiners.*